(12) United States Patent  (10) Patent No.: US 7,986,356 B2
Chang et al.  (45) Date of Patent: Jul. 26, 2011

(54) SYSTEM AND METHOD FOR DETERMINING A GAMMA CURVE OF A DISPLAY DEVICE

(75) Inventors: Nelson Liang An Chang, San Jose, CA (US); Niranjan Damera-Venkata, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 750 days.

(21) Appl. No.: 11/880,998

(22) Filed: Jul. 25, 2007

(65) Prior Publication Data

US 2009/0027523 A1  Jan. 29, 2009

(51) Int. Cl.
H04N 5/202 (2006.01)
(52) U.S. Cl. ......................... 348/254; 348/187; 382/284
(58) Field of Classification Search .................. None
See application file for complete search history.

(56) References Cited

U.S. PATENT DOCUMENTS

| | | |
|---|---|---|
| 4,373,784 A | 2/1983 | Nonomura et al. |
| 4,662,746 A | 5/1987 | Hornbeck |
| 4,811,003 A | 3/1989 | Strathman et al. |
| 4,956,619 A | 9/1990 | Hornbeck |
| 5,061,049 A | 10/1991 | Hornbeck |
| 5,083,857 A | 1/1992 | Hornbeck |
| 5,146,356 A | 9/1992 | Carlson |
| 5,309,241 A | 5/1994 | Hoagland |
| 5,317,409 A | 5/1994 | Macocs |
| 5,386,253 A | 1/1995 | Fielding |
| 5,402,184 A | 3/1995 | O'Grady et al. |
| 5,408,267 A | 4/1995 | Main |
| 5,490,009 A | 2/1996 | Venkateswar et al. |
| 5,557,353 A | 9/1996 | Stahl |
| 5,621,487 A | 4/1997 | Shirochi |
| 5,689,116 A | 11/1997 | Heukensfeldt Jansen |
| 5,689,283 A | 11/1997 | Shirochi |
| 5,713,083 A | 2/1998 | Takayama |
| 5,751,379 A | 5/1998 | Markandey et al. |
| 5,842,762 A | 12/1998 | Clarke |
| 5,897,191 A | 4/1999 | Clarke |
| 5,912,773 A | 6/1999 | Barnett et al. |
| 5,920,365 A | 7/1999 | Eriksson |
| 5,978,518 A | 11/1999 | Oliyide et al. |

(Continued)

FOREIGN PATENT DOCUMENTS

EP  1 001 306 A2  5/2000

(Continued)

OTHER PUBLICATIONS

C. Jaynes et al., "Super-Resolution Composition in Multi-Projector Displays," IEEE Int'l Workshop on Projector-Camera Systems, Oct. 2003; 8 pgs.

(Continued)

*Primary Examiner* — Jason Chan
*Assistant Examiner* — Yih-Sien Kao

(57) ABSTRACT

A method of determining a gamma curve of a display device includes identifying a region of interest of a display surface of the display device. A centroid of the region of interest is calculated. A plurality of input levels is applied to the display device to generate a corresponding plurality of displayed images on the display surface. At least one image of each of the displayed images is captured with a camera. A gamma curve of the display device is calculated based on the captured images and the centroid.

18 Claims, 6 Drawing Sheets

U.S. PATENT DOCUMENTS

| | | | |
|---|---|---|---|
| 5,982,916 A * | 11/1999 | Kuhn | 382/132 |
| 5,990,949 A | 11/1999 | Haruki | |
| 6,025,951 A | 2/2000 | Swart et al. | |
| 6,067,143 A | 5/2000 | Tomita | |
| 6,101,287 A | 8/2000 | Corum et al. | |
| 6,104,375 A | 8/2000 | Lam | |
| 6,118,584 A | 9/2000 | Van Berkel et al. | |
| 6,141,039 A | 10/2000 | Poetsch | |
| 6,184,969 B1 | 2/2001 | Fergason | |
| 6,219,017 B1 | 4/2001 | Shimada et al. | |
| 6,239,783 B1 | 5/2001 | Hill et al. | |
| 6,243,055 B1 | 6/2001 | Fergason | |
| 5,402,009 A1 | 11/2001 | Tabata | |
| 6,313,823 B1 * | 11/2001 | Cappels et al. | 345/589 |
| 6,317,171 B1 | 11/2001 | Dewald | |
| 6,384,816 B1 | 5/2002 | Tabata | |
| 6,390,050 B2 | 5/2002 | Feikus | |
| 6,393,145 B2 | 5/2002 | Betrisey et al. | |
| 6,522,356 B1 | 2/2003 | Watanabe | |
| 6,535,624 B1 * | 3/2003 | Taylor, Jr. | 382/128 |
| 6,657,603 B1 | 12/2003 | Demetrescu et al. | |
| 6,963,370 B2 | 11/2005 | DiCarlo et al. | |
| 7,009,636 B2 | 3/2006 | Liu et al. | |
| 7,038,727 B2 | 5/2006 | Majumder et al. | |
| 7,038,849 B1 | 5/2006 | Samuels et al. | |
| 7,113,565 B2 * | 9/2006 | Endo | 378/62 |
| 7,215,362 B2 | 5/2007 | Klose | |
| 2002/0154318 A1 * | 10/2002 | Matsunaga et al. | 356/623 |
| 2003/0001810 A1 * | 1/2003 | Yamaguchi et al. | 345/87 |
| 2003/0020809 A1 | 1/2003 | Gibbon et al. | |
| 2003/0076325 A1 | 4/2003 | Thrasher | |
| 2003/0198401 A1 * | 10/2003 | Shimazaki et al. | 382/274 |
| 2004/0085477 A1 | 5/2004 | Majumder et al. | |
| 2004/0150795 A1 | 8/2004 | Ishii et al. | |
| 2004/0196250 A1 | 10/2004 | Mehrotra et al. | |
| 2004/0239885 A1 | 12/2004 | Jaynes et al. | |
| 2004/0258292 A1 * | 12/2004 | Matsuno | 382/132 |
| 2005/0053309 A1 * | 3/2005 | Szczuka et al. | 382/284 |
| 2005/0083402 A1 | 4/2005 | Klose | |
| 2005/0105057 A1 * | 5/2005 | Matsuda et al. | 353/70 |
| 2005/0134711 A1 | 6/2005 | Hori | |
| 2005/0276502 A1 | 12/2005 | Brown et al. | |
| 2006/0244849 A1 | 11/2006 | Chen et al. | |
| 2006/0274217 A1 * | 12/2006 | Bae et al. | 348/791 |
| 2007/0002143 A1 | 1/2007 | Elberbaum | |
| 2007/0009175 A1 | 1/2007 | Lim et al. | |
| 2007/0091334 A1 | 4/2007 | Yamaguchi et al. | |
| 2007/0092135 A1 | 4/2007 | Piirainen | |
| 2007/0097213 A1 * | 5/2007 | Ajito | 348/189 |

FOREIGN PATENT DOCUMENTS

| | | |
|---|---|---|
| EP | 1 434 434 A1 | 6/2004 |

OTHER PUBLICATIONS

L.M. Chen & S. Hasagawa, "Visual Resolution Limits for Color Matrix Displays—One Panel Projectors," vol. 13, pp. 221-226; 1992.

A. Yasuda et al., "FLC Wobbling for High-Resolution Projectors," Journal of the SID, pp. 229-305; May 1997.

T. Tokita et al., "P-108: FLC Resolution Enhancing Device for Projection Displays," pp. 229-305; SID 02 Digest 2002.

D.K. Kelley, "Motion and Vision—II. Stablilized Spatio-Temporal Threshold Surface," Journal of the Optical Society of America, vol. 69, No. 10; Oct. 1979.

Candice H. Brown Elliott et al., "Color Subpixel REndering Projectors and Flat Panel Displays," SMPTE Advanced Motion Imaging Conference; pp. 1-4; Feb. 27-Mar. 1, 2003.

Diana C. Chen, "Display Resolution Enhancement with Optical Scanners," Applied Optics, vol. 40, No. 5, pp. 636-643; Feb. 10, 2001.

E. Stupp et al., "Projection Displays," SID Series in Display Technology, Wiley; 1999.

R. Juang et al., "Photomeric Self-Calibration of a Projector-Camera System," 8 pgs.

S. Lim et al., "Gain Fixed Pattern Noise Correction via Optical Flow," 9 pgs.

A. El Gamal et al., "Modeling and Estimation of FPN Components in CMOS Image Sensors," Information Systems Laboratory, Stanford University, 10 pgs.

* cited by examiner

SYSTEM AND METHOD FOR DETERMINING A GAMMA CURVE OF A DISPLAY DEVICE

BACKGROUND

Two types of projection display systems are digital light processor (DLP) systems, and liquid crystal display (LCD) systems. Applications for such display systems include multi-projector tiled projection and multi-projector superimposed projection. Many imaging applications, including multi-projector display systems, use a camera for measurement purposes. In order to accurately measure properties of the display system, the camera should first be calibrated. Image sensor analog-to-digital converters (ADCs) typically have dark current effects that may lead to non-zero readings even when capturing absolutely no photons. For the same ambient conditions, the sensor readings may vary pixel-to-pixel, but generally not over time. Hence, fixed pattern noise occurs that can corrupt each and every captured image, thereby affecting every measurement for the imaging application. Furthermore, with typical image sensors, the fixed pattern noise may vary as a function of exposure.

In addition to the problem of fixed pattern noise, some imaging applications capture images from different exposures and integrate them together for high dynamic range imaging. In this case, it is desirable to know the camera transfer curve for an accurate measurement. Moreover, many of the calibration steps may be performed using different exposures, and thus it may be desirable for the camera transfer curve to be estimated in advance.

For many imaging applications, including multi-projector display systems, it is desirable to accurately estimate the display gamma of the display devices (e.g., projectors). It is known to use a spectrophotometer to measure the display gamma of a display device. However, this approach is expensive, slow, and localized to a particular spot on the screen. It is also typically impractical to use a spectrophotometer in the field.

SUMMARY

One embodiment provides a method of determining a gamma curve of a display device. The method includes identifying a region of interest of a display surface of the display device. A centroid of the region of interest is calculated. A plurality of input levels is applied to the display device to generate a corresponding plurality of displayed images on the display surface. At least one image of each of the displayed images is captured with a camera. A gamma curve of the display device is calculated based on the captured images and the centroid.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," etc., may be used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following Detailed Description, therefore, is not to be taken in a limiting sense, and the scope of the present invention is defined by the appended claims.

I. Multi-Projector Display System

As mentioned above in the Background section, many imaging applications, including multi-projector display systems, use a camera for measurement purposes. In order to accurately measure properties of the display system, the camera should first be calibrated. One embodiment provides an automated camera calibration process that improves image measurements, especially for low-light situations and high dynamic range imaging, as well as for imaging and computer vision applications. One embodiment provides techniques for calibrating a camera and accounting for noise and variations to achieve high quality results with minimal noise. Although specific embodiments are described below in the context of a multi-projector display system, it will be understood that the techniques set forth herein are also applicable to other types of display systems and devices (e.g., LCD monitor, plasma display, single-projector display systems, as well as other display systems and devices).

Figure 1:
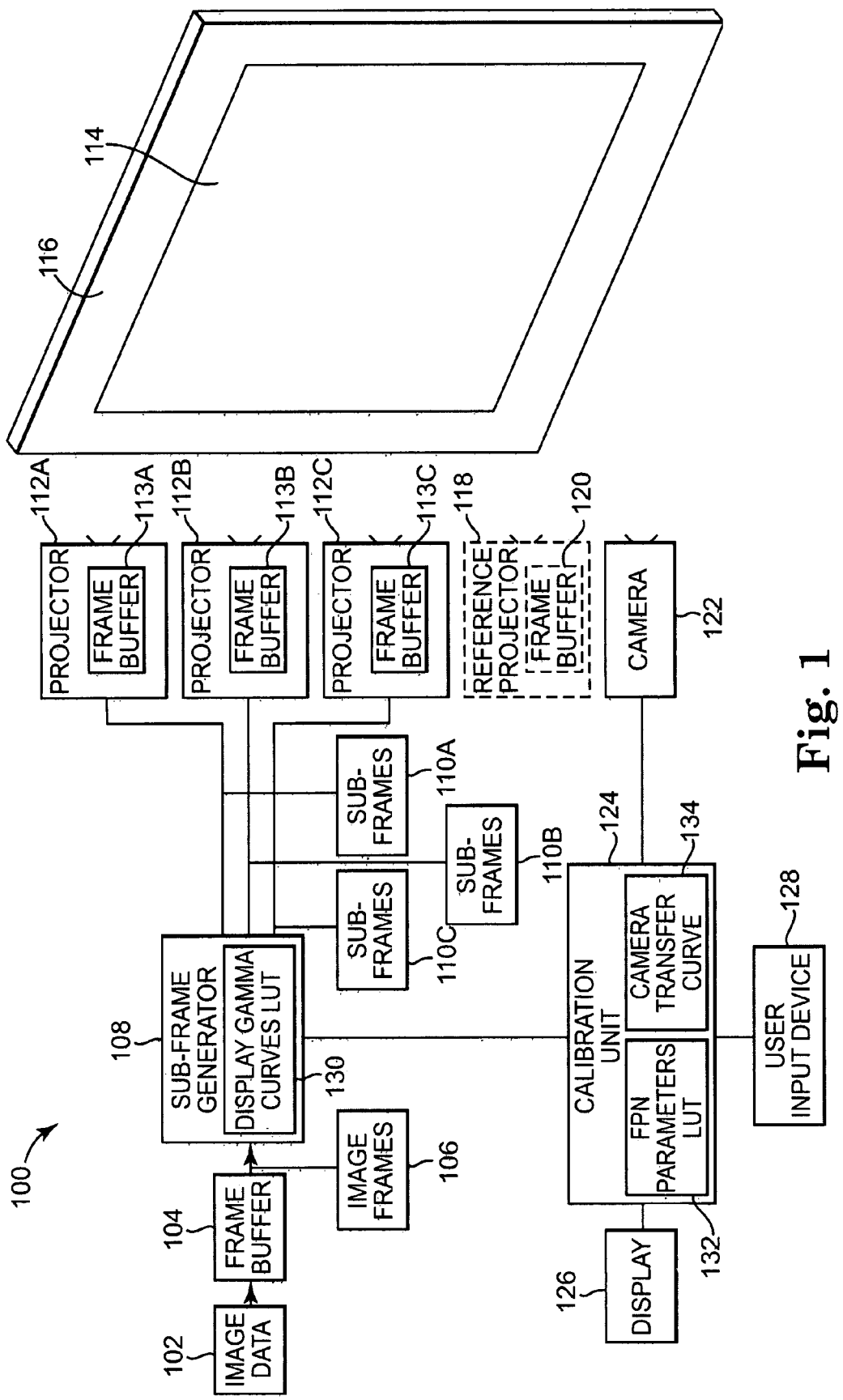
FIG. 1 is a block diagram illustrating an image display system according to one embodiment.

FIG. 1 is a block diagram illustrating an image display system 100 according to one embodiment. Image display system 100 processes image data 102 and generates a corresponding displayed image 114. Displayed image 114 is defined to include any pictorial, graphical, or textural characters, symbols, illustrations, or other representations of information.

In one embodiment, image display system 100 includes image frame buffer 104, sub-frame generator 108, projectors 112A-112C (collectively referred to as projectors 112), camera 122, calibration unit 124, display 126, and user input device 128. Image frame buffer 104 receives and buffers image data 102 to create image frames 106. Sub-frame generator 108 processes image frames 106 to define corresponding image sub-frames 110A-110C (collectively referred to as sub-frames 110). In one embodiment, for each image frame 106, sub-frame generator 108 generates one sub-frame 110A for projector 112A, one sub-frame 110B for projector 112B, and one sub-frame 110C for projector 112C. The sub-frames 110A-110C are received by projectors 112A-112C, respectively, and stored in image frame buffers 113A-113C (collectively referred to as image frame buffers 113), respectively. Projectors 112A-112C project the sub-frames 110A-110C, respectively, onto a target surface or display surface 116 to produce displayed image 114 for viewing by a user. Target surface 116 can be planar or curved, or have any other shape.

In one form of the invention, target surface 116 is translucent, and display system 100 is configured as a rear projection system.

In one embodiment, the projected sub-frames 110 are all superimposed sub-frames. In another embodiment, the projected sub-frames 110 are all tiled sub-frames. In yet another embodiment, the projected sub-frames 110 include a combination of tiled and superimposed sub-frames (e.g., two tiled sub-frames 110, and two superimposed sub-frames 110 that substantially overlap each other and that each substantially overlap both of the tiled sub-frames 110) In one embodiment, sub-frames 110 are generated by sub-frame generator 108 for any arbitrary combination of tiled and superimposed projectors 112 based on techniques disclosed in U.S. patent application Ser. No. 11/301,060, filed on Dec. 12, 2005, and entitled SYSTEM AND METHOD FOR DISPLAYING AN IMAGE, which is hereby incorporated by reference herein.

Image frame buffer 104 includes memory for storing image data 102 for one or more image frames 106. Thus, image frame buffer 104 constitutes a database of one or more image frames 106. Image frame buffers 113 also include memory for storing sub-frames 110. Examples of image frame buffers 104 and 113 include non-volatile memory (e.g., a hard disk drive or other persistent storage device) and may include volatile memory (e.g., random access memory (RAM)).

Sub-frame generator 108 receives and processes image frames 106 to define a plurality of image sub-frames 110. Sub-frame generator 108 generates sub-frames 110 based on image data in image frames 106. In one embodiment, sub-frame generator 108 generates image sub-frames 110 with a resolution that matches the resolution of projectors 112, which is less than the resolution of image frames 106 in one embodiment. Sub-frames 110 each include a plurality of columns and a plurality of rows of individual pixels representing a subset of an image frame 106. In one embodiment, sub-frame generator 108 determines appropriate values for the sub-frames 110 so that the displayed image 114 produced by the projected sub-frames 110 is close in appearance to how the high-resolution image (e.g., image frame 106) from which the sub-frames 110 were derived would appear if displayed directly.

Projectors 112 receive image sub-frames 110 from sub-frame generator 108 and, in one embodiment, simultaneously project the image sub-frames 110 onto target surface 116 at spatially offset positions to produce displayed image 114. In one embodiment, display system 100 is configured to give the appearance to the human eye of high-resolution displayed images 114 by displaying overlapping and spatially shifted lower-resolution sub-frames 110 from multiple projectors 112. In one form of the invention, the projection of overlapping and spatially shifted sub-frames 110 gives the appearance of enhanced resolution (i.e., higher resolution than the sub-frames 110 themselves). It will be understood by persons of ordinary skill in the art that the sub-frames 110 projected onto target surface 116 may have perspective distortions, and the pixels may not appear as perfect squares with no variation in the offsets and overlaps from pixel to pixel (such as that shown in FIGS. 2A-2C). Rather, in one form of the invention, the pixels of sub-frames 110 take the form of distorted quadrilaterals or some other shape, and the overlaps may vary as a function of position. Thus, terms such as "spatially shifted" and "spatially offset positions" as used herein are not limited to a particular pixel shape or fixed offsets and overlaps from pixel to pixel, but rather are intended to include any arbitrary pixel shape, and offsets and overlaps that may vary from pixel to pixel.

Also shown in FIG. 1 is a reference projector 118 with an image frame buffer 120. Reference projector 118 is shown with hidden lines in FIG. 1 because, in one embodiment, projector 118 is not an actual projector, but rather is a hypothetical high-resolution reference projector that is used in an image formation model for generating optimal sub-frames 110. In one embodiment, the location of one of the actual projectors 112 is defined to be the location of the reference projector 118.

In one embodiment, display system 100 includes a controllable camera 122 (e.g., a Firewire camera, a digital SLR camera, or other controllable camera), and a calibration unit 124, which are used in one form of the invention to automatically determine a geometric mapping between each projector 112 and the reference projector 118, as well as perform various measurements. In one embodiment, images of the sub-frames 110 that are projected onto target surface 116 are captured by camera 122 and analyzed by calibration unit 124 to determine characteristics of the current projector configuration. In one form of the invention, calibration unit 124 is configured to display information (via display 126) regarding the current projector configuration, and allow a user to interactively adjust the display characteristics via user input device 128. Camera 122 and calibration unit 124 are described in further detail below with reference to FIGS. 3-6.

It will be understood by a person of ordinary skill in the art that functions performed by sub-frame generator 108, camera 122, and calibration unit 124 may be implemented in hardware, software, firmware, or any combination thereof. In one embodiment, the implementation may be via a microprocessor, programmable logic device, or state machine. Components of the present invention may reside in software on one or more computer-readable mediums. The term computer-readable medium as used herein is defined to include any kind of memory, volatile or non-volatile, such as floppy disks, hard disks, CD-ROMs, flash memory, read-only memory, and random access memory.

In one form of the invention, image display system 100 includes hardware, software, firmware, or a combination of these. In one embodiment, one or more components of image display system 100 are included in a computer, computer server, or other microprocessor-based system capable of performing a sequence of logic operations. In addition, processing can be distributed throughout the system with individual portions being implemented in separate system components, such as in a networked or multiple computing unit environments.

Figure 2:
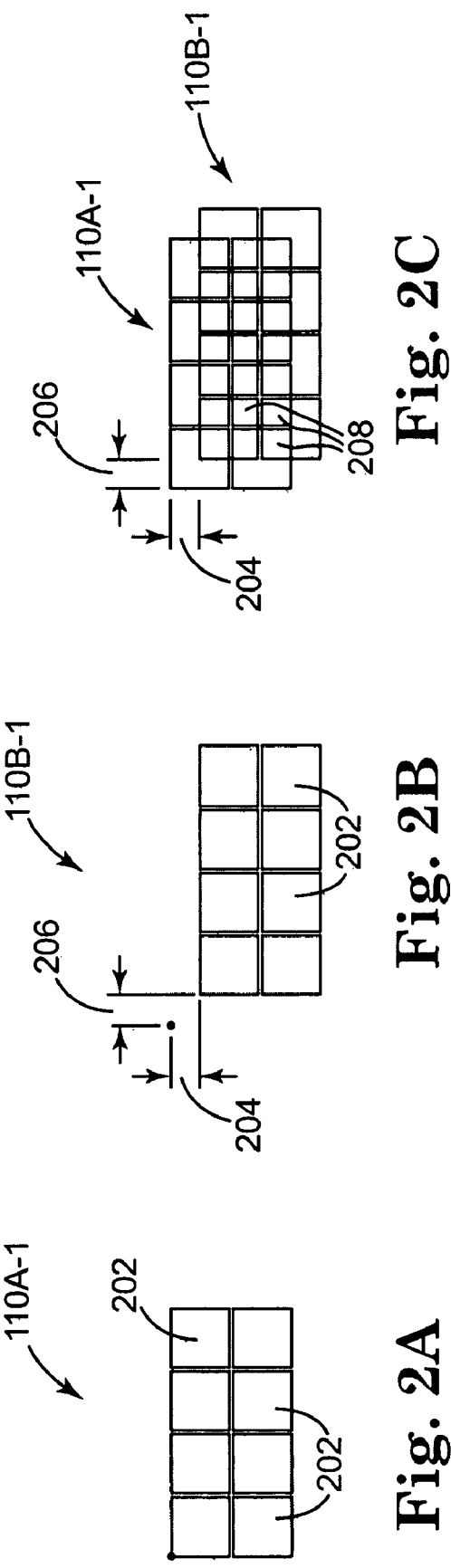
FIGS. 2A-2C are schematic diagrams illustrating the projection of two sub-frames according to one embodiment.

In one embodiment, display system 100 uses two projectors 112. FIGS. 2A-2C are schematic diagrams illustrating the projection of two sub-frames 110 according to one embodiment. As illustrated in FIGS. 2A and 2B, sub-frame generator 108 defines two image sub-frames 110 for each of the image frames 106. More specifically, sub-frame generator 108 defines a first sub-frame 110A-1 and a second sub-frame 110B-1 for an image frame 106. As such, first sub-frame 110A-1 and second sub-frame 110B-1 each include a plurality of columns and a plurality of rows of individual pixels 202 of image data.

In one embodiment, as illustrated in FIG. 2B, when projected onto target surface 116, second sub-frame 110B-1 is offset from first sub-frame 110A-1 by a vertical distance 204 and a horizontal distance 206. As such, second sub-frame 110B-1 is spatially offset from first sub-frame 110A-1 by a predetermined distance. In one illustrative embodiment, vertical distance 204 and horizontal distance 206 are each approximately one-half of one pixel.

As illustrated in FIG. 2C, a first one of the projectors 112A projects first sub-frame 110A-1 in a first position and a second one of the projectors 112B simultaneously projects second sub-frame 110B-1 in a second position, spatially offset from the first position. More specifically, the display of second sub-frame 110B-1 is spatially shifted relative to the display of first sub-frame 110A-1 by vertical distance 204 and horizontal distance 206. As such, pixels of first sub-frame 110A-1 overlap pixels of second sub-frame 110B-1, thereby producing the appearance of higher resolution pixels 208. The overlapped sub-frames 110A-1 and 110B-1 also produce a brighter overall image 114 than either of the sub-frames 110 alone. In other embodiments, more than two projectors 112 are used in system 100, and more than two sub-frames 110 are defined for each image frame 106, which results in a further increase in the resolution, brightness, and color of the displayed image 114.

In one form of the invention, sub-frames 110 have a lower resolution than image frames 106. Thus, sub-frames 110 are also referred to herein as low-resolution images or sub-frames 110, and image frames 106 are also referred to herein as high-resolution images or frames 106. It will be understood by persons of ordinary skill in the art that the terms low resolution and high resolution are used herein in a comparative fashion, and are not limited to any particular minimum or maximum number of pixels.

In one form of the invention, display system 100 produces a superimposed projected output that takes advantage of natural pixel mis-registration to provide a displayed image 114 with a higher resolution than the individual sub-frames 110. In one embodiment, image formation due to multiple overlapped projectors 112 is modeled using a signal-processing model. Optimal sub-frames 110 for each of the component projectors 112 are estimated by sub-frame generator 108 based on the model, such that the resulting image predicted by the signal-processing model is as close as possible to the desired high-resolution image to be projected.

In one embodiment, sub-frame generator 108 is configured to generate sub-frames 110 based on the maximization of a probability that, given a desired high resolution image, a simulated high-resolution image that is a function of the sub-frame values, is the same as the given, desired high-resolution image. If the generated sub-frames 110 are optimal, the simulated high-resolution image will be as close as possible to the desired high-resolution image.

II. Camera Calibration

As mentioned above, camera 122 and calibration unit 124 are used in one form of the invention to automatically determine a geometric mapping between each projector 112 and the reference projector 118, as well as perform various measurements. In order to accurately measure properties of the display system 100, the camera 122 is first calibrated.

Figure 3:
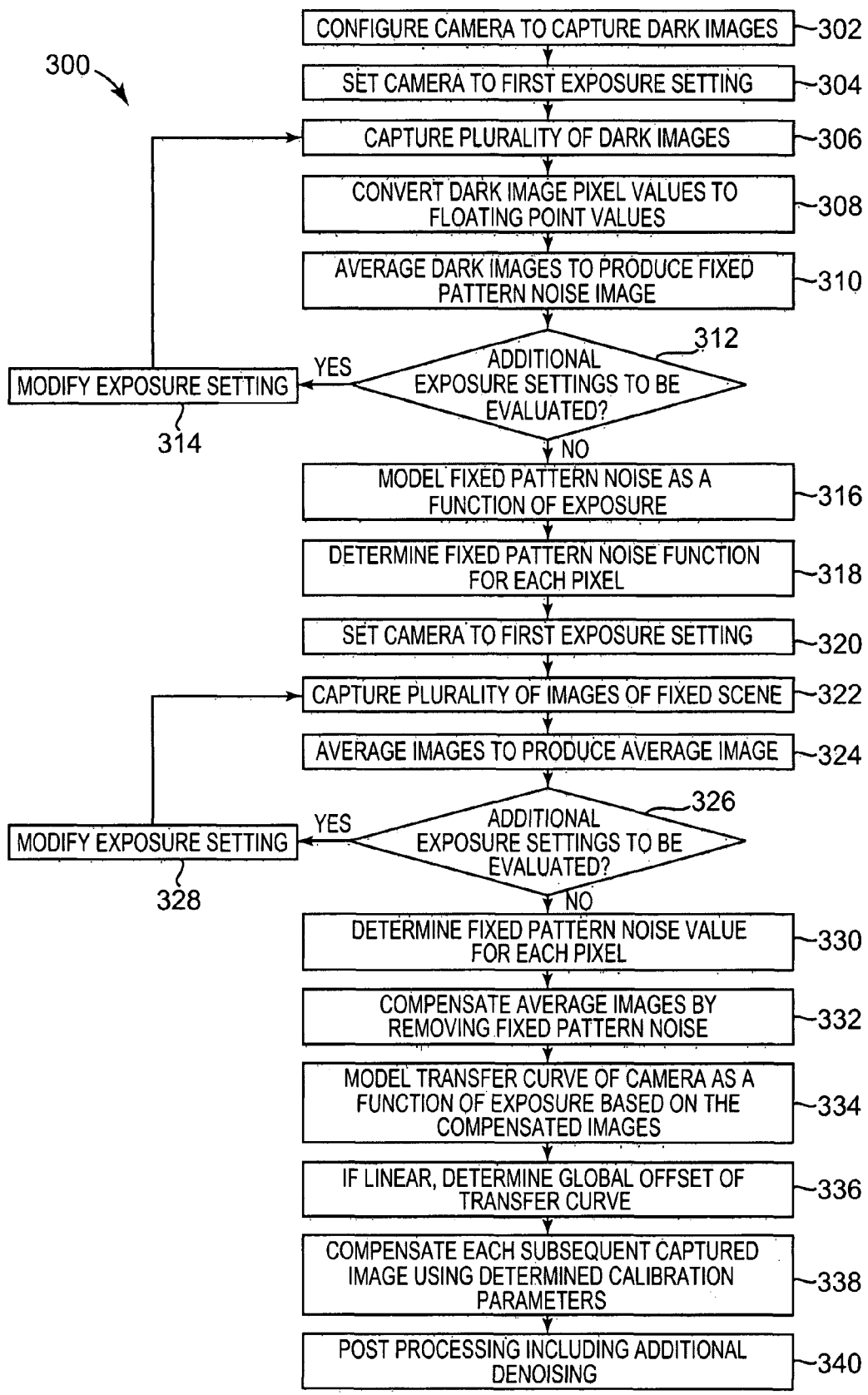
FIG. 3 is a flow diagram illustrating a method of calibrating a camera according to one embodiment.

FIG. 3 is a flow diagram illustrating a method 300 of calibrating camera 122 according to one embodiment. A first part of method 300 is to determine the spatially-varying fixed pattern noise of camera 122. At 302, camera 122 is configured to capture dark images (also referred to herein as fixed pattern noise images). In one embodiment, a lens cap is put over the lens of camera 122 at 302 so that no photons or substantially no photons hit the image sensor of the camera 122. At 304, calibration unit 124 sets camera 122 to a first exposure setting, $e_k$, where k is an integer index for identifying different exposures settings. At 306, camera 122 captures a plurality of dark images at the current exposure setting. In a specific embodiment, camera 122 captures one hundred dark images at 306.

In one embodiment, the dark images captured at 306 comprise 8-bit unsigned char pixel values. At 308, the 8-bit unsigned char values of the dark images captured at 306 are converted by calibration unit 124 to floating point values in the range of zero to one. The remaining operations are then performed on the floating point values. At 310, the dark images captured at 306 (and converted to floating point values at 308) are averaged by calibration unit 124, thereby producing a single fixed pattern noise image, $m_k$, which represents an average of the dark images or fixed pattern noise images captured at 306. The averaging performed at 310 helps to significantly reduce temporal noise contained in the captured dark images. For example, averaging N frames reduces the standard deviation of the temporal noise by a factor of square-root-of N.

At 312, calibration unit 124 determines whether there are additional exposure settings to be evaluated. If it is determined at 312 that there are no additional exposure settings to be evaluated, method 300 moves to 316 (discussed below). If it is determined at 312 that there are additional exposure settings to be evaluated, method 300 moves to 314. At 314, the current exposure setting of camera 122 is modified by calibration unit 124, and the method 300 returns to 306 to capture a plurality of dark images at the modified exposure setting. In one embodiment of method 300, calibration unit 124 is configured to modify the exposure setting of camera 122 a plurality of times to generate dark images at a plurality of different exposures. In a specific embodiment, calibration unit 124 sets the camera 122 to a variety of uniformly spaced exposures between the minimum and maximum exposure settings of the camera 122, and causes camera 122 to capture a plurality of dark images at each of these exposures. The dark images at each exposure setting are averaged at 310 to generate a single fixed pattern noise image, $m_k$, corresponding to that exposure setting. Thus, a plurality of exposure settings are evaluated by method 300 according to one embodiment, and a corresponding plurality of fixed pattern noise images, $m_k$, are generated.

At 316, each pixel of each of the fixed pattern noise images, $m_k$, is modeled as a function of exposure, $e_k$. In one embodiment, the spatially varying fixed pattern noise at each pixel as a function of exposure is modeled at 316 with a cubic polynomial function as shown in the following Equation I:

$$m_k(u,v) = a(u,v) + b(u,v)*e_k + c(u,v)*e_k^2 + d(u,v)*e_k^3 \qquad \text{Equation I}$$

where:
  k=index for identifying exposure settings;
  (u,v)=indices for identifying pixel location;
  $m_k(u,v)$=value of pixel (u,v) in the fixed pattern noise image corresponding to the kth exposure setting;
  a, b, c, and d=parameters to be solved; and
  $e_k$=exposure value at the kth exposure setting.

Equation I can be represented in matrix form as shown in the following Equation II, where N in Equation II is an integer representing the total number of exposure settings that are evaluated, and correspondingly the number of fixed pattern noise images, $m_k$, that are generated at 310:

$$\underbrace{\begin{bmatrix} 1 & e_1 & e_1^2 & e_1^3 \\ 1 & e_2 & e_2^2 & e_2^3 \\ & \cdots & & \\ 1 & e_N & e_N^2 & e_N^3 \end{bmatrix}}_{A} \underbrace{\begin{bmatrix} a(u,v) \\ b(u,v) \\ c(u,v) \\ d(u,v) \end{bmatrix}}_{x} = \underbrace{\begin{bmatrix} m_1(u,v) \\ m_2(u,v) \\ \cdots \\ m_N(u,v) \end{bmatrix}}_{y} \qquad \text{Equation II}$$

As shown above in Equation II, the first matrix in the equation is represented by the letter "A", the second matrix is represented by the letter "x", and the third matrix is represented by the letter "y". Using these representations, Equation II can be rewritten as shown in the following Equation III:

$$x = ((A^T A)^{-1} A^T) y = By \qquad \text{Equation III}$$

The letter "B" in Equation III represents a pseudoinverse matrix that results from performing the operations, $(A^T A)^{-1} A^T$, on the "A" matrix given in Equation II.

Returning to method 300, at 318, for each pixel of camera 122, a function or equation for determining the fixed pattern noise at that pixel is determined by calibration unit 124. In one embodiment, the function for each pixel is determined at 318 by solving Equation III using a least squares technique. The result is a cubic polynomial equation with four parameters (a, b, c, and d) for every pixel of camera 122. The values of the four parameters (a, b, c, and d) may vary from pixel to pixel. Because the same pseudoinverse matrix, B, may be used over all pixels of the camera 122, the calculation can be performed very efficiently using pixel shaders of a GPU in calibration unit 124.

In one embodiment, the resulting values for the four parameters (a, b, c, and d) for each pixel of camera 122 are stored in a fixed pattern noise (FPN) parameters look-up table (LUT) 132 (FIG. 1) in calibration unit 124. To determine the fixed pattern noise at any given pixel (u,v) of camera 122 for any given exposure, e, the values of the four parameters (a, b, c, and d) corresponding to that pixel are identified from the look-up table 132 and inserted into the following Equation IV:

$$FPN(u,v) = a(u,v) + b(u,v)*e + c(u,v)*e^2 + d(u,v)*e^3 \qquad \text{Equation IV}$$

where:
(u,v)=indices for identifying pixel location;
FPN(u,v)=value of fixed pattern noise for pixel (u,v);
a, b, c, and d=parameters solved for at 318 in method 300, and stored in look-up table 132; and
e=exposure value.

In another embodiment, rather than calculating and storing the four parameters (a, b, c, and d), the fixed pattern noise images themselves (generated at 310) are stored in calibration unit 124, and later used to compensate subsequently captured images. In one form of this embodiment, when a subsequent image is captured, at least one of the stored fixed pattern noise images is identified based on the exposure of the subsequent image, and the identified at least one image is used to remove fixed pattern noise from the subsequently captured image. In one embodiment, the identified at least one fixed pattern noise image comprises an image with an exposure corresponding to the exposure of the subsequently captured image. In another embodiment, the identified at least one fixed pattern noise image comprises a plurality of images with exposures that are close in value to the exposure of the subsequently captured image, and an interpolation function is performed on the identified images to generate a fixed pattern noise image corresponding to the exposure of the subsequently captured image.

The next part of method 300 is to determine the transfer curve of camera 122 (i.e., the ratio of the output response of camera 122 to the input intensity). At 320, calibration unit 124 sets camera 122 to a first exposure setting. At 322, camera 122 captures a plurality of images of a fixed scene (e.g., a scene that remains constant with fixed lighting during the calibration process) at the current exposure setting. At 324, the images captured at 322 are averaged by calibration unit 124, thereby producing a single average image.

At 326, calibration unit 124 determines whether there are additional exposure settings to be evaluated. If it is determined at 326 that there are no additional exposure settings to be evaluated, method 300 moves to 330 (discussed below). If it is determined at 326 that there are additional exposure settings to be evaluated, method 300 moves to 328. At 328, the current exposure setting of camera 122 is modified by calibration unit 124, and the method 300 returns to 322 to capture a plurality of images of the fixed scene at the modified exposure setting. In one embodiment of method 300, calibration unit 124 is configured to modify the exposure setting of camera 122 a plurality of times to generate images of the fixed scene at a plurality of different exposures. In a specific embodiment, calibration unit 124 sets the camera 122 to a variety of uniformly spaced exposures between the minimum and maximum exposure settings of the camera 122, and causes camera 122 to capture a plurality of images of the fixed scene at each of these exposures. The images at each exposure setting are averaged at 324 to generate a single average image corresponding to that exposure setting. Thus, a plurality of exposure settings are evaluated by method 300 according to one embodiment, and a corresponding plurality of average images of the fixed scene are generated.

At 330, for each of the average images generated at 324, a fixed pattern noise value is determined by calibration unit 124 for each pixel of the average image. In one embodiment, the fixed pattern noise value for each pixel is determined using Equation IV based on the exposure setting for the average image and the values of the four parameters (a, b, c, and d) corresponding to that pixel (contained in look-up table 132). At 332, the average images generated at 324 are compensated by calibration unit 124 by removing the fixed pattern noise determined at 330, thereby generating a compensated image corresponding to each average image. In one embodiment, for each pixel of each of the average images, the fixed pattern noise value determined for that pixel is subtracted from the original value of the pixel to thereby generate a compensated pixel value.

At 334, based on the compensated images generated at 332, the transfer curve of camera 122 as a function of exposure is modeled using a polynomial or other function. It is often the case that the transfer curve will be linear in the typical operating range, especially if the camera 122 can be manually set to a gamma value of one or close to one. In this case, a linear fit is typically sufficient. The camera transfer curve 134 (FIG. 1) is stored in calibration unit 124. At 336, based on the model generated at 334, the global offset, if any, (i.e., a global offset or y-intercept offset exists if the transfer curve does not pass through the origin) of the transfer curve is determined by calibration unit 124.

At 338, the calibration parameters determined by method 300 (e.g., the values for the parameters a, b, c, d, for each pixel of camera 122, as well as the global offset) are used to compensate each subsequent image captured by camera 122. In one embodiment, an image is compensated at 338 by subtracting the fixed pattern noise (calculated using Equation IV) and the global offset (calculated at 336) from the raw image data of the image. In one embodiment, at 338, the raw image data of each image is first converted from unsigned char values to floating point values, the compensation operations are then performed on the floating point values, and then the resulting values are converted back to unsigned char values.

At 340, post processing operations, including additional denoising, are performed on the compensated images generated at 338. Additional denoising can help further clean up the compensated images. For instance, after removal of the fixed pattern noise at 338, it is possible that imaging artifacts still remain in the images. In one embodiment, the camera 122 includes an image sensor that uses a color Bayer pattern, and method 300 is applied directly to the raw sensor data before color demosaicing. In one embodiment, a 3×3 median filter is applied at 340 to each Bayer subimage (i.e., for an RGGB Bayer pattern, a subimage consisting of only the R pixels is formed, then the first G pixels, then the second G pixels, and finally the B pixels), then the filtered subimages are recombined to form a single image again. In another embodiment, more sophisticated denoising with edge-preserving filtering is applied at 340. The resulting images can then be color demosaiced and used for subsequent image processing.

In one embodiment, the compensated images generated by method 300 are used to measure one or more parameters or characteristics of each projector 112. In one embodiment, the compensated images generated by method 300 are used by calibration unit 124 to determine geometric mappings, luminance characteristics, color characteristics, black offset, as well as a gamma curve for each of the projectors 112. The determination of a gamma curve (i.e., mapping between digital input values and the display output levels) for each of the projectors 112 according to one embodiment is described in further detail below with reference to FIGS. 4-6. In one embodiment, once the camera 122 is compensated by method 300, the camera 122 is used to measure additional parameters or characteristics of the camera 122, such as nonlinear camera lens distortion, vignetting effects, color, as well as others.

III. Determining Gamma Curve of Display Device

Projectors and other displays typically remap the input range to some function of their light output to better utilize the output bits for the human visual system. It is common to assume that the relationship is exponential (i.e., output=input^gamma). However, this assumption is often wrong for a number of reasons. The display settings may directly alter this curve (e.g., the user can set the display to be in a "cool" mode rather than a "neutral" mode, etc.). Different optics, lifespan of an LCD panel, bulb life, display settings, different manufacturer's settings and parts, as well as other factors, can all affect the gamma curve. In addition, the gamma curve of a given display device may not be the same for all three color channels (e.g., Red, Green, and Blue) of the device. These factors become even more apparent when using multiple display devices (possibly from different manufacturers) for the same application, such as in a multi-projector display system. Many imaging applications, including embodiments of display system 100, operate in linear light space, and it is desirable to have accurate gamma curve estimations in order to appropriately pre-compensate input values provided to the projectors 112 to help ensure correct rendering. For a tiled multi-projector system, it is desirable to obtain an accurate gamma estimation to help ensure a seamless display. It is desirable for multi-display applications to use the correct gamma curves or else the resulting images will not appear correct.

One embodiment provides a system and method for reliably and automatically estimating the display gamma curve for each display device in the display system, such as for each projector 112 in display system 100. Although specific embodiments are described below in the context of the multi-projector display system 100, it will be understood that the techniques set forth herein are also applicable to other types of display systems. In one embodiment, both the forward (input to output) and inverse (output to input) gamma mappings for each projector 112 are determined.

Figure 4:
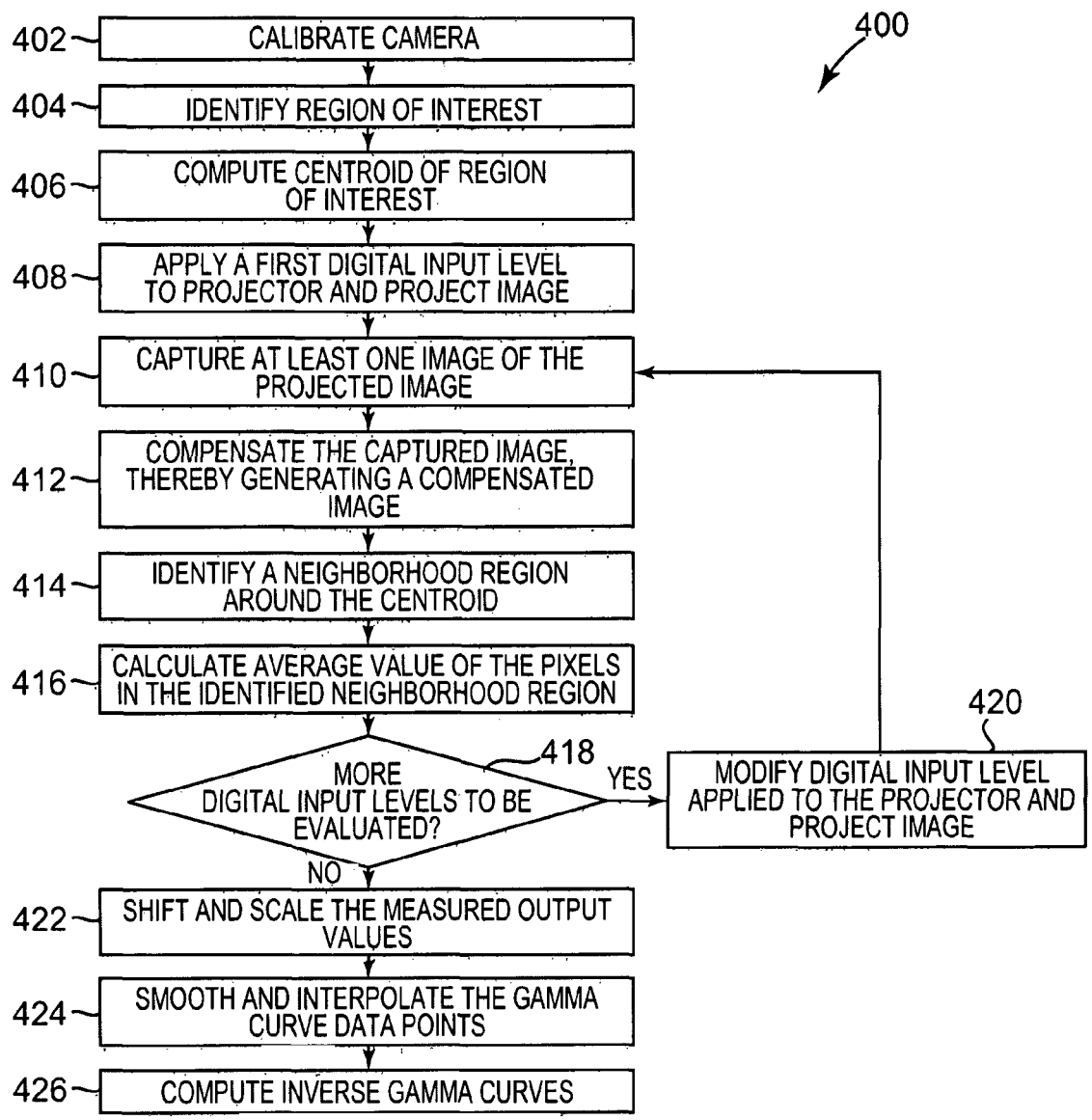
FIG. 4 is a flow diagram illustrating a method of determining a gamma curve of a display device according to one embodiment.

FIG. 4 is a flow diagram illustrating a method 400 of determining a gamma curve of a display device according to one embodiment. In one embodiment, method 400 is used to determine a gamma curve for each of the projectors 112. At 402 in method 400, camera 122 is calibrated. In one embodiment, camera 122 is calibrated using method 300 (FIG. 3). After calibration, subsequent images captured by camera 122 are compensated using the calibration parameters determined by method 300, as described above.

At 404, a region of interest on target surface 116 is identified. In one embodiment, the region of interest corresponds to the portion of an image projected by a projector 112 onto target surface 116 that is within the field of view of the camera 122. If the entire projected image is visible to the camera 122 (i.e., within the field of view of the camera 122), then the region of interest identified at 404 represents the entire area occupied by the projected image in one embodiment. If only a portion of a projected image is visible to the camera 122, then the portion that is visible to the camera 122 represents the region of interest in one embodiment.

In one embodiment, a differentiation technique is used to identify the region of interest at 404. With the differentiation technique according to one embodiment, the projector 112 projects an all-white image, and then projects an all-black image, onto target surface 116. Camera 122 captures the two projected images. Calibration unit 124 computes the difference between the two captured images, thereby generating a difference image, and identifies the largest connected region in the difference image, which represents the region of interest. With the differentiation technique according to another embodiment, the projector 112 projects a plurality of all-white images, and then projects a plurality of all-black images, onto target surface 116. Camera 122 captures an image of each of the projected images. Calibration unit 124 averages the captured images of the all-white images, thereby generating a first average image, and averages the captured images of the all-black images, thereby generating a second average image. Calibration unit 124 computes the difference between the two average images, thereby generating a difference image, and identifies the largest connected region in the difference image, which represents the region of interest. In another embodiment, the region of interest is identified at 404 by projecting structured light patterns with the projector 112, and then capturing images of the light patterns with camera 122. The region of interest corresponds to the largest connected region (or "blob"), which is identified by an automated process in one embodiment. In another embodiment, the region of interest is selected by a user.

At 406, calibration unit 124 computes the centroid of the region of interest identified at 404. At 408, a first digital input level (normalized within the range [0,1]) is applied to the projector 112, and the projector 112 projects a corresponding image onto target surface 116. In one embodiment, the image that is projected at 408 is limited to one of the three color channels, which enables calculation of a separate gamma curve for the three color channels independently. At 410, camera 122 captures at least one image of the entire projected image, or the portion of the projected image within the field of view of camera 122. To help improve estimates, in one embodiment, high dynamic range imaging is performed at 410, which involves capturing images at multiple exposures, and then integrating the measured values to a common exposure setting.

At 412, the image captured at 410 is compensated based on the calibration parameters determined at 402, thereby generating a compensated image that accounts for fixed pattern noise, camera transfer curve, and other artifacts. At 414, a neighborhood region around the centroid calculated at 406 is identified. At 416, an average value of the pixels in the identified neighborhood region is calculated, thereby determining a mean output value corresponding to the input level applied at 408.

At 418, calibration unit 124 determines whether there are any more digital input levels to be evaluated. If it is determined at 418 that there are no more digital input levels to be evaluated, the method 400 moves to 422 (discussed below). If it is determined at 418 that there are additional digital input levels to be evaluated, the method 400 moves to 420. At 420, the digital input level (normalized within the range [0,1]) applied to the projector 112 is modified to a next level, the projector 112 projects a corresponding image onto target surface 116, and the method 400 returns to 410 to capture at least one image of the projected image. In one embodiment, steps 410-420 are repeated until all desired input levels and color channels are evaluated. For each color channel, the result is a set of input levels and their associated measured output values (i.e., three sets of forward gamma curve data—one set for each color channel).

At 422, calibration unit 124 shifts and scales the measured output values (i.e., the mean output values calculated at 416) to be in the range from zero to one. In one embodiment, at 422, the darkest output value of each set of gamma curve data is shifted to zero, the brightest output value of the same set is shifted to one, and the remainder of the set is normalized accordingly.

At 424, calibration unit 124 smoothes and/or interpolates the gamma curve data points. In one embodiment, calibration unit 124 performs cubic spline fitting or a higher order polynomial fitting at 424 to create a smooth gamma curve for each color channel. In one embodiment, the gamma curves are stored in gamma curves look-up table 130 in sub-frame generator 108. In one embodiment, look-up table 130 includes 4096 entries. The gamma curves provide a mapping from an arbitrary input digital value in the range of [0,1] to an output value in the range of [0,1]. The gamma curves for the different color channels may be different from one another, as well as from the "ideal" gamma equals 2.2 curve. At 426, calibration unit 124 computes an inverse gamma curve for each of the three color channels based on the calculated forward gamma curves, and stores the inverse gamma curve data in LUT 130.

Figure 5:
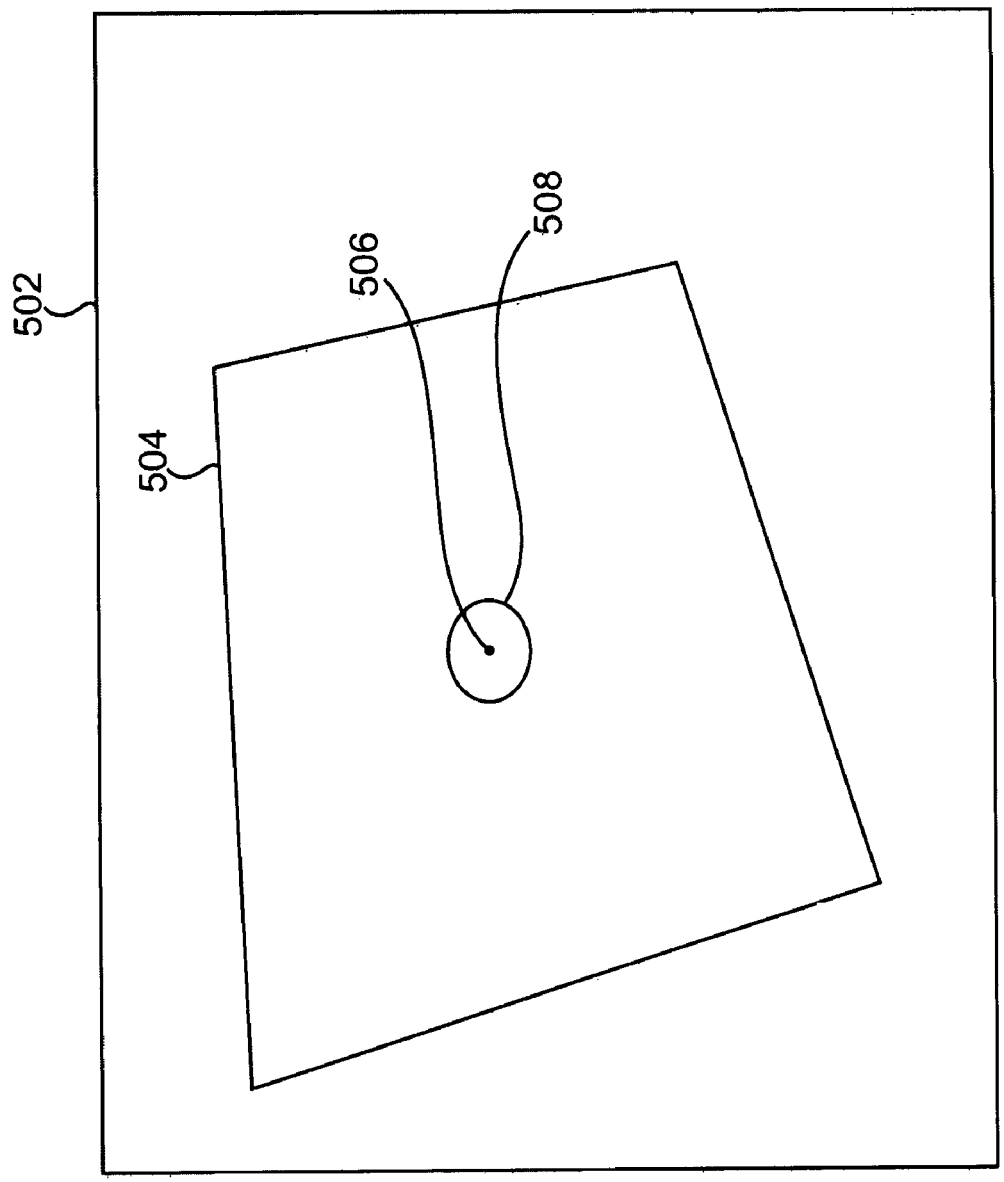
FIG. 5 is a diagram illustrating a camera field of view and a projected image according to one embodiment.

Aspects of method 400 will now be described in further detail with reference to FIG. 5. FIG. 5 is a diagram illustrating a camera field of view 502 and a projected image 504 according to one embodiment. Field of view 502 represents the portion of the target surface 116 that is visible to, or within the field of view of, camera 122. Projected image 504 represents a sub-frame 110 that has been projected onto target surface 116 by one of the projectors 112. In the illustrated embodiment, the entire projected image 504 is within the field of view 502 of the camera 122. Thus, the region of interest identified at 404 in method 400 corresponds to the entire image 504. Also shown in FIG. 5 is the centroid 506 of the region of interest 504, which is calculated at 406, as well as a neighborhood region 508 around the centroid, which is identified at 414 in method 400. In other embodiments, the neighborhood region 508 will have a different shape or size than that shown in FIG. 5.

Figure 6:
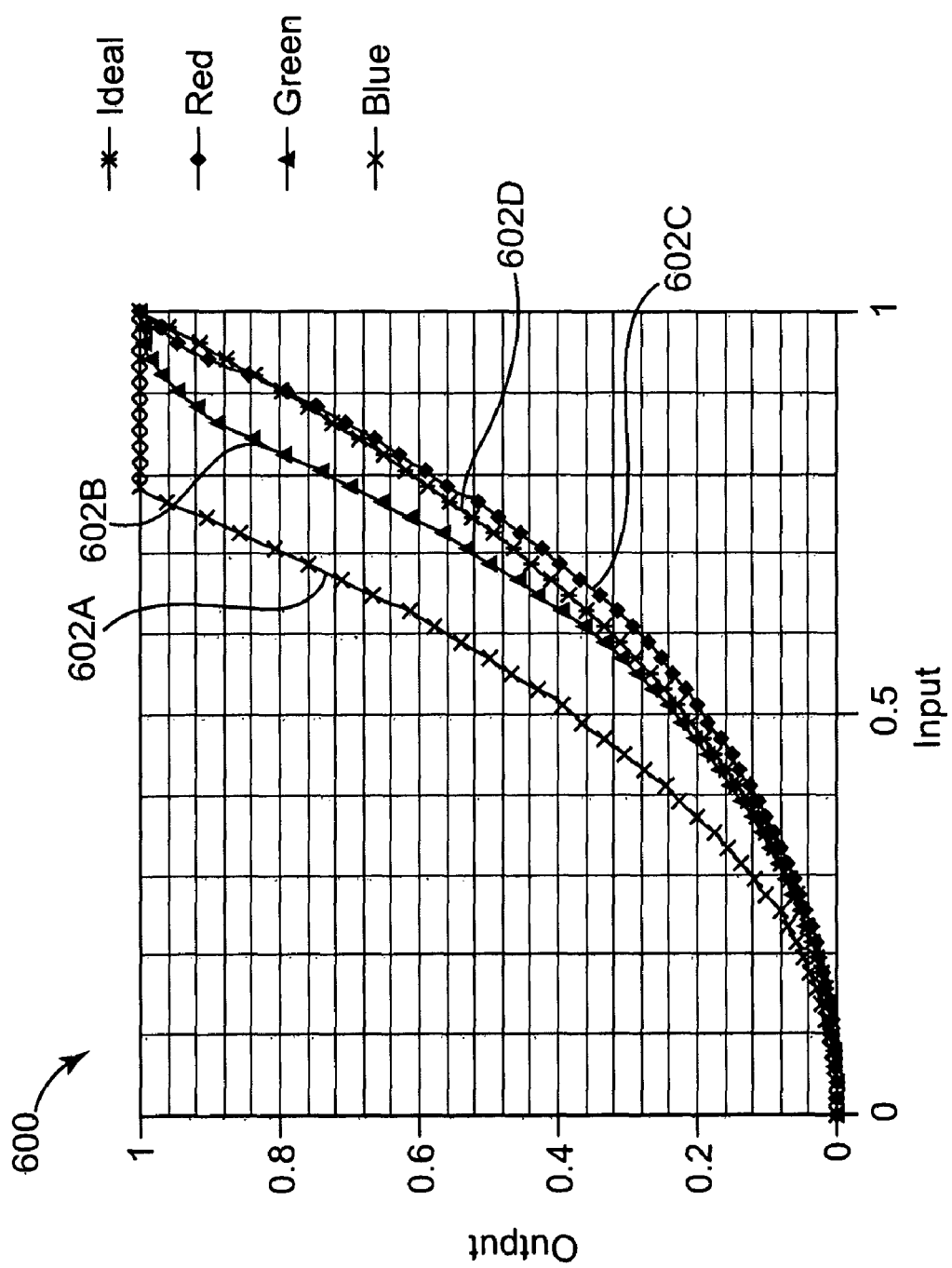
FIG. 6 is a diagram illustrating a graph of gamma curves of a display device determined by the method illustrated in FIG. 4 according to one embodiment.

FIG. 6 is a diagram illustrating a graph 600 of gamma curves of a display device determined by method 400 according to one embodiment. The horizontal axis in graph 600 represents digital input levels in the range of zero to one for a projector 112. The vertical axis in graph 600 represents output levels in the range of zero to one for a projector 112. Curve 602A is a gamma curve for the blue color channel of a projector 112 as determined by method 400. Curve 602B is a gamma curve for the green color channel of the same projector 112 as determined by method 400. Curve 602C is a gamma curve for the red color channel of the same projector 112 as determined by method 400. Curve 602D is an "ideal" gamma curve, which assumes a gamma value of 2.2. As shown in FIG. 6, the measured gamma curves 602A-602C for the different color channels are different from one another, as well as from the "ideal" gamma curve 602D.

There are several ways in which the gamma curves generated by method 400 may be used by a display system, such as display system 100. In one embodiment, sub-frame generator 108 performs imaging algorithms in a linear output space, and pre-compensates the sub-frames 110 with the inverse gamma curves before the sub-frames 110 reach the projectors 112 to help ensure that the output is correct. A second way in which the gamma curves may be used is to use the forward gamma curves to help predict a displayed image. In this case, the forward gamma curves are applied to the sub-frames 110 being input to the projectors 112. The resulting images can be used as a reasonable prediction to the physical output from the projectors 112. The resulting images can also be compensated for differences in geometry, color, luminance, as well as other factors, to get a much more accurate prediction.

Many imaging applications use a camera for measurement purposes. One embodiment of the present invention provides a practical and robust camera measurement system and method for imaging applications, including multi-projector imaging systems, such as system 100. One embodiment provides a completely automated camera calibration process that improves image measurements, especially for low-light situations and high dynamic range imaging, as well as for imaging and computer vision applications. One embodiment provides techniques for calibrating a camera and accounting for noise and variations to achieve high quality results with minimal noise. The calibration techniques according to specific embodiments improve image captures, and provide reliable black offset measurement (and correction) for multi-projector tiled applications, thus allowing for increased contrast ratio while still maximizing seamlessness. One embodiment provides denoising techniques that improve the low-light black offset measurement of a multi-projector display system.

One embodiment provides an automatic calibration process that solves for the spatially and exposure varying fixed pattern noise at arbitrary exposure settings, as well as the camera transfer curve. In one embodiment, the noise of every pixel is modeled independently as a function of exposure. In one embodiment, a camera 122 is used as an accurate measurement and calibration device for various imaging applications.

One embodiment provides a system including a camera 122 that automatically and robustly estimates the gamma of all display devices (e.g., projectors 112) in the display system. The camera-based measurement system according to one embodiment is a fast and relatively inexpensive means for estimating display gamma, and is less expensive than using a spectrophotometer.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method of determining a gamma curve of a display device, the method comprising:
   identifying a region of interest of a display surface of the display device;
   calculating a centroid of the region of interest; applying a plurality of input levels to the display device to generate a corresponding plurality of displayed images on the display surface;
   capturing at least one image of each of the displayed images with a camera; and
   calculating a gamma curve of the display device based on the captured images and the centroid,
   wherein calculating a gamma curve comprises:
      identifying a neighborhood region around the centroid; and
      for each captured image, calculating an average value of pixels positioned within the identified neighborhood region, wherein the calculated average values represent output values of the gamma curve corresponding to the plurality of input levels.

2. The method of claim 1, and further comprising:
   capturing a set of dark images at each of a plurality of different exposure settings, thereby generating a plurality of sets of dark images;
   averaging each set of dark images, thereby generating a fixed pattern noise image corresponding to each one of the exposure settings; and
   determining an equation for each pixel of the camera for determining fixed pattern noise at that pixel as a function of exposure based on the fixed pattern noise images, wherein each equation includes an exposure setting value of the camera raised to a plurality of different powers.

3. The method of claim 2, and further comprising:
   removing fixed pattern noise from images captured by the camera based on the determined equations, thereby generating corresponding compensated images, and wherein the gamma curve is calculated based on the compensated images and the centroid.

4. The method of claim 1, wherein the display device is a projector.

5. The method of claim 1, wherein identifying a region of interest comprises:
   displaying an all-white image;
   capturing a first image of the all-white image with the camera;
   displaying an all-black image;
   capturing a second image of the all-black image with the camera;
   computing a difference between the first and the second images, thereby generating a difference image; and
   identifying a largest blob in the difference image, wherein the largest blob represents the identified region of interest.

6. The method of claim 1, wherein identifying a region of interest comprises:
   displaying a plurality of all-white images;
   capturing an image of each of the all-white images with the camera, thereby generating a first set of captured images;
   averaging the first set of captured images, thereby generating a first average image;
   displaying a plurality of all-black images;
   capturing an image of each of the all-black images with the camera, thereby generating a second set of captured images;
   averaging the second set of captured images, thereby generating a second average image;
   computing a difference between the first and the second average images, thereby generating a difference image; and
   identifying a largest blob in the difference image, wherein the largest blob represents the identified region of interest.

7. The method of claim 1, wherein capturing at least one image comprises:
   capturing a plurality of images of each of the displayed images at a plurality of different exposures with the camera; and
   integrating each plurality of images into a common exposure image.

8. The method of claim 1, wherein the input levels are in a range of zero to one, and wherein calculating a gamma curve further comprises:
   shifting and scaling the average values to be in a range of zero to one.

9. The method of claim 1, and further comprising:
   performing a curve fitting operation on the average values to smooth the gamma curve.

10. The method of claim 1, and further comprising:
    generating sub-frames for display in a multi-projector system based on the calculated gamma curve.

11. The method of claim 1, wherein the plurality of displayed images are single color channel images, and the calculated gamma curve is representative of a single color channel of the display device.

12. A system for determining a gamma curve of a display device, comprising:
    a first controller configured to apply a plurality of input levels to the display device to generate a corresponding plurality of displayed images on a display surface of the display device;
    a camera configured to capture at least one image of each of the displayed images; and
    a second controller configured to identify a region of interest of the display surface, calculate a centroid of the region of interest, and calculate a gamma curve of the display device based on the captured images and the centroid'
    wherein the second controller is configured to identify a neighborhood region around the centroid, and, for each captured image, calculate an average value of pixels positioned within the identified neighborhood region, wherein the calculated average values represent output values of the gamma curve corresponding to the plurality of input levels.

13. The system of claim 12, wherein the camera is configured to capture a set of dark images at each of a plurality of different exposure settings, thereby generating a plurality of sets of dark images, and wherein the second controller is configured to average each set of dark images, thereby generating a fixed pattern noise image corresponding to each one of the exposure settings, and wherein the second controller is configured to determine an equation for each pixel of the camera for determining fixed pattern noise at that pixel as a function of exposure based on the fixed pattern noise images, wherein each equation includes an exposure setting value of the camera raised to a plurality of different powers.

14. The system of claim 13, wherein the second controller is configured to remove fixed pattern noise from images captured by the camera based on the determined equations, thereby generating corresponding compensated images, and wherein the gamma curve is calculated based on the compensated images and the centroid.

15. The system of claim 12, wherein the display device is a projector.

16. The system of claim 12, wherein the input levels are in a range of zero to one, and wherein the second controller is configured to shift and scale the average values to be in a range of zero to one.

17. The system of claim 12, wherein the second controller is configured to perform a curve fitting operation on the average values to smooth the gamma curve.

18. A computer-readable medium having computer-executable instructions for performing a method of determining a gamma curve of a display device, the method comprising:

calculating a centroid of a region of interest of a display surface;

identifying a neighborhood region around the centroid;

applying a plurality of input levels to the display device to generate a corresponding plurality of displayed images on the display surface;

causing at least one image of each of the displayed images to be captured with a camera; and for each captured image, calculating an average value of pixels positioned within the identified neighborhood region, wherein the calculated average values represent output values of a gamma curve corresponding to the plurality of input levels.

* * * * *

UNITED STATES PATENT AND TRADEMARK OFFICE
CERTIFICATE OF CORRECTION

PATENT NO.         : 7,986,356 B2
APPLICATION NO.    : 11/880998
DATED              : July 26, 2011
INVENTOR(S)        : Nelson Liang An Chang et al.

It is certified that error appears in the above-identified patent and that said Letters Patent is hereby corrected as shown below:

In column 14, line 44, in Claim 12, delete "centroid" and insert -- centroid, --, therefor.

Signed and Sealed this
Twenty-eighth Day of February, 2012

David J. Kappos
*Director of the United States Patent and Trademark Office*